(12) United States Patent
Gowreesunker et al.

(10) Patent No.: US 9,885,627 B2
(45) Date of Patent: Feb. 6, 2018

(54) DRIFT COMPENSATION FOR FORCE SENSING DEVICES

(71) Applicant: Apple Inc., Cupertino, CA (US)

(72) Inventors: Baboo V. Gowreesunker, Cupertino, CA (US); Wayne C. Westerman, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 371 days.

(21) Appl. No.: 14/696,043

(22) Filed: Apr. 24, 2015

(65) Prior Publication Data

US 2016/0313205 A1 Oct. 27, 2016

(51) Int. Cl.
*G01L 25/00* (2006.01)

(52) U.S. Cl.
CPC .................... *G01L 25/00* (2013.01)

(58) Field of Classification Search
CPC ...................................... G01L 25/00
See application file for complete search history.

(56) References Cited

U.S. PATENT DOCUMENTS

| | | | | |
|---|---|---|---|---|
| 4,935,700 A * | 6/1990 | Garbini | ................. | G01B 7/023 324/662 |
| 5,345,807 A * | 9/1994 | Butts | ...................... | A47J 27/62 73/1.15 |
| 5,440,237 A * | 8/1995 | Brown | ................. | G01D 18/006 324/130 |
| 6,275,087 B1 * | 8/2001 | Dehghan | ................ | H04L 25/062 327/306 |
| 8,265,308 B2 | 9/2012 | Gitzinger et al. | | |
| 9,288,305 B2 | 3/2016 | Turunen | | |
| 2006/0105817 A1 | 5/2006 | Naick | | |
| 2008/0096489 A1 * | 4/2008 | He | .......... | G01R 29/08 455/75 |
| 2011/0059733 A1 | 3/2011 | Kim | | |
| 2011/0304648 A1 | 12/2011 | Kim et al. | | |
| 2013/0271427 A1 * | 10/2013 | Benbasat | .............. | G06F 3/0418 345/175 |
| 2014/0135631 A1 | 5/2014 | Brumback et al. | | |
| 2014/0354527 A1 | 12/2014 | Chen | | |
| 2015/0140979 A1 | 5/2015 | Agsteiner | | |
| 2015/0262458 A1 | 9/2015 | Faaborg et al. | | |
| 2015/0323398 A1 * | 11/2015 | Lauzier | ................. | B25J 9/0081 73/862.08 |
| 2016/0070404 A1 * | 3/2016 | Kerr | ...................... | G06F 3/0418 345/174 |
| 2017/0090667 A1 * | 3/2017 | Abdollahian | ......... | G06F 3/0418 |

* cited by examiner

*Primary Examiner* — Natalie Huls
(74) *Attorney, Agent, or Firm* — Brownstein Hyatt Farber Schreck, LLP (57) ABSTRACT

Disclosed herein are methods and systems for compensating for drift that may be present in a force sensing device. In some embodiments, the force sensing device may be calibrated to compensate for the drift. The calibration may include receiving an input waveform associated with a received amount of force on the force sensing device. A system model that approximates a transfer function that provides an output waveform associated with the input waveform is then determined. Using the system model, an inverse transfer function associated with the system model is also determined. The inverse transfer function may then be applied to the output waveform which compensates for the drift.

13 Claims, 9 Drawing Sheets

DRIFT COMPENSATION FOR FORCE SENSING DEVICES

TECHNICAL FIELD

The present disclosure generally relates to force sensing devices. More specifically, the present disclosure is directed to compensating for drift that may occur in force sensing devices such as those used in various computing devices.

BACKGROUND

Computing devices may use force sensors to detect a received force. However, due to different materials used in these force sensors, and more specifically, due to different elastic deformation characteristics of the materials and/or structures, the force sensor may not accurately detect the amount of force being applied at a particular time. More specifically, the force sensor may continue to detect that force is being applied to the force sensor even if the force has been removed as it may take some amount of time for the elastomeric material in the force sensor to return to its original (e.g., nominal) position, shape or state. In other cases, the force sensor may continue to detect an increase in force even when a constant or substantially constant force is applied to the force sensor. This increase in sensed force may also be caused by the elastic properties of the materials within the force sensor and/or the structure of the force sensor.

In addition to the above, the elastic deformation of the materials in the force sensor and/or the structure of the force sensor itself, may cause a delayed reaction associated with the received force input. For example, if a force input is received and the computing device does not react to the received input a timely manner (e.g., updating a user interface, launching an application and so on), the user experience with the computing device may be diminished.

It is with respect to these and other general considerations that embodiments have been made. Although relatively specific problems have been discussed, it should be understood that the embodiments should not be limited to solving the specific problems identified in this background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Disclosed herein are methods and systems for compensating for drift that may be present in one or more force sensors of a computing device. More specifically, some embodiments described herein are directed toward calibrating a force sensing device. In this implementation, an input waveform is received by the system. The input waveform is associated with a received amount of force that is or was provided on a force sensing device. The system determines a system model that approximates a transfer function that provides an output waveform associated with the input waveform. An inverse transfer function of the approximated transfer function is then determined. The inverse transfer function is then applied to the output waveform. As will be explained below, the inverse transfer function compensates for drift that may be associated with the force sensing device which is manifest in the output waveform.

Also disclosed is a method and system for correcting drift associated with a force sensing device. The force sensing device may be associated with or otherwise integrated within a computing device. In some implementations, an output signal may be received from the force sensing device. Once the output signal is received, an inverse filter is applied to the output signal to generate a reconstructed output signal that compensates for drift. The inverse filter may be based, at least in part, on a model of the force sensing device that is derived at the time the computing device is calibrated.

BRIEF DESCRIPTION OF THE DRAWINGS

Embodiments of the present disclosure will be readily understood by the following detailed description in conjunction with the accompanying drawings. The elements of the drawings are not necessarily to scale relative to each other. Identical reference numerals have been used, where possible, to designate identical features that are common to the figures.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. The following detailed description is, therefore, not to be taken in a limiting sense.

Figure 1A:
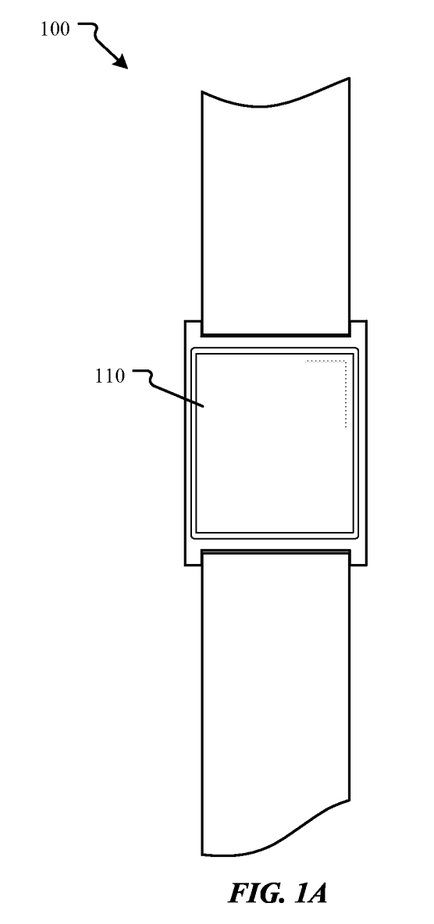
FIGS. 1A-1C illustrate exemplary computing devices that may incorporate a force sensor according to one or more embodiments of the present disclosure.
Figure 1B:
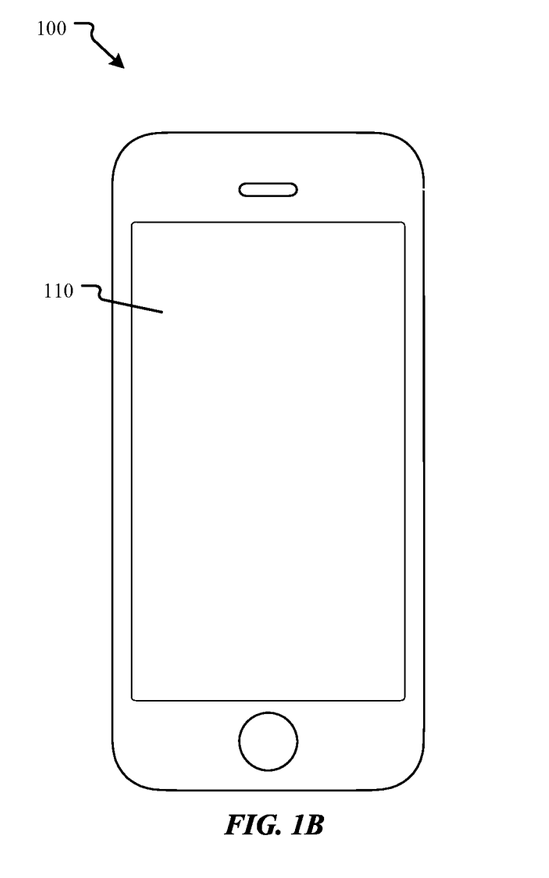
Figure 1C:
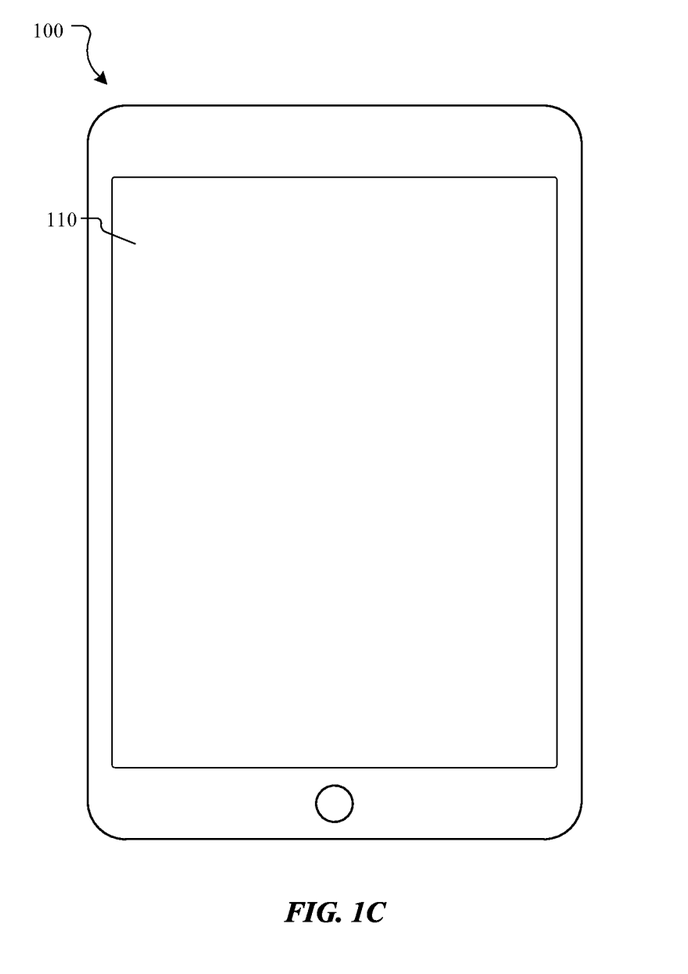

In some implementations, a computing device, such as those shown in FIGS. 1A-1C, a trackpad for a laptop computer or other input device may use a force sensing device to receive input from a user or an object manipulated by an object (e.g., stylus). The force sensing device may be associated or integrated with a display on the computing device. Further, force received on the display and detected by the force sensing device may affect or otherwise change what is output on the display. For example, force input on the display may cause a processing unit of the computing device to alter a user interface that is output on the display, launch an application, answer an incoming telephone call, and so on.

However, the force sensing device itself can affect the quality of waveforms that are output therefrom. For example, a waveform can be distorted, attenuated, or otherwise affected as a result of the materials and/or structure selected for a particular force sensing device. In other examples, the structure of the force sensing device can affect the output waveform. In a more specific example, a force sensing trackpad or other such input device may use one or more spring mechanisms to detect force input. However, the coupling of the springs to a housing of the electronic device may cause the output waveform to be distorted.

In a more specific example, and as will be described in more detail below, the force sensor may be comprised of a piezoelectric material. However, due to one or more elastic deformation characteristics of the piezoelectric material, drift may be introduced into the system. For example, if force input is received and then subsequently removed from the force sensing device, the force sensing device may continue to detect an applied force as the piezoelectric material decompresses or otherwise returns to its non-compressed or otherwise returns to its nominal state. Likewise, when force is applied to the force sensing device, the applied force may be constant or substantially constant but the force sensing device may determine that the amount of force is increasing as the piezoelectric material continues to contract due to the applied force.

Accordingly, many embodiments described herein model the force sensing device as a linear time-invariant ("LTI") system having a single input and a single output. These embodiments can include a filter designed to account for the effects of the LTI system (e.g., inverse of the transfer function). As a result of the filter, the waveform output from the force sensing device may more accurately reproduce the input to the force sensing device.

In these embodiments, the filter can correspond to the inverse of a transfer function that models the LTI behavior of the force sensing device. That is, in some embodiments, a model of the force sensing device may be used to approximate a transfer function associated with the force sensing device. In some embodiments, the coefficients of the transfer function model (and/or its inverse) can be approximated analytically. In other embodiments, the coefficients of the transfer function model can be approximated experimentally. Accordingly, many embodiments described herein relate to methods for efficiently approximating a transfer function and/or an inverse of the transfer function (along with their coefficients) of a particular force sensing device given a particular input waveform. Thereafter, the transfer function (or parameters that define the transfer function) can be saved as calibration parameters and can be used as an effective approximation of the transfer function for other waveforms.

The methods and devices described herein may be used with substantially any type of apparatus or device that utilizes a force sensing device. For example, FIGS. 1A-1C illustrate exemplary computing devices 100 that may be used with the various embodiments described herein. As shown in FIG. 1A, the computing device 100 may be a wearable computing device. Alternatively or additionally, as depicted in FIG. 1B and FIG. 1C, the computing device 100 may be a mobile telephone or a tablet computer. It should be noted that the computing devices 100 illustrated and described are illustrative only and the embodiments described herein may be used with various other types of computing devices or computing devices including, but not limited to, a desktop or laptop computer, a trackpad or other such input device, a digital music player, a digital camera, a personal digital assistant or the like.

As shown in FIGS. 1A-1C, the computing device 100 may include a display 110. In some embodiments, the display 110 may include a touch sensor that is configured to detect and measure the location of a touch on a surface of the computing device 100. In some implementations, the touch sensor is a capacitive touch sensor that is disposed relative to the display 110 or a display stack of the computing device 100. The touch input that is received on the display 110 may be used to control various aspects of the computing device 100. For example, the touch input may be used to control an aspect of the user interface presented on the display 110 and may also control or influence various other aspects, functionality and/or components of the computing device 100.

In some implementations, the computing device 100 may also include a force sensing device that uses a force sensor configured to detect and measure the magnitude, direction, and/or location of a force of a touch on a surface of the computing device 100 such as, for example, the display 110.

The input force may include a non-binary output that is generated in response to a touch. For example, the force may include a range of values that corresponds to the amount of force exerted on the display 110 of the computing device 100. Additionally or alternatively, the force input may include binary (e.g., on, off) output in response to the received force. As with the touch input described above, the force input may be used to control various aspects of the computing device 100. For example, the force input may be used to control an aspect of a user interface provided on the display 110, such as, a cursor or item selection on the user interface. The force input may also be used to control other components, aspects and/or functionality of the computing device 100.

In some implementations, the force input may be used to distinguish between different types of input received from a user. For example, a light touch from the user may be interpreted as a scroll command and/or can be used to index through a list of items on the display 110. A harder touch from the user may be interpreted as a selection or confirmation of an item on the display 110. In some embodiments, the force input may be used to distinguish an intentional touch from the user from an incidental or accidental touch that should be ignored.

In some embodiments, the touch sensor may be a separate non-integrated sensor relative to the force sensor. In alternative embodiments, the touch sensor may also be physically and/or logically integrated with the force sensor to produce a combined output.

Figure 2:
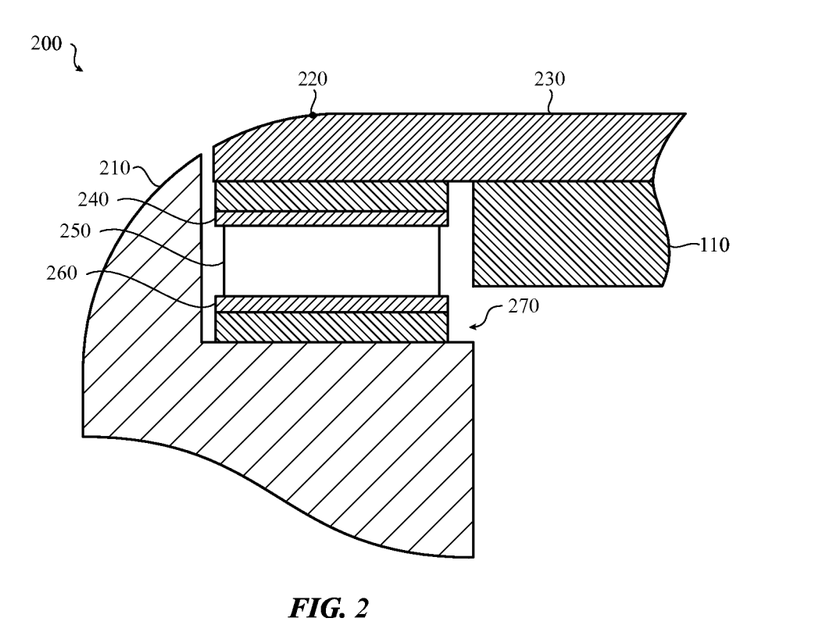
FIG. 2 illustrates an exemplary force sensor that may be used with the various computing devices shown in FIGS. 1A-1C according to one or more embodiments of the present disclosure.

FIG. 2 depicts a cross-sectional view of a portion of a force sensing device 200 that may be used with one or more embodiments of the present disclosure. In some embodiments and as shown in FIG. 2, the force sensing device 200 may be arranged around a perimeter of a display 110. As also shown in FIG. 2, a force-sensing structure 270 of the force sensing device 200 may be disposed beneath a cover 230 associated with the display 110 and along the side or the perimeter of the display 110. In this example, the force sensing device 200 is configured to detect and measure the amount of force of a touch on the surface 220 of the cover 230.

The force sensing device 200 may include a first capacitive plate 240 and a second capacitive plate 260. In some embodiments, the first capacitive plate 240 may be fixed with respect to the cover 230. Likewise, the second capacitive plate 260 may be fixed with respect to a housing 210 of the computing device and may be disposed on a shelf or mounting surface located along the perimeter of the computing device. The first capacitive plate 240 and the second capacitive plate 260 may be separated by a compressible element 250. As noted, and although a capacitive plates may be used, the force sensing device may also be comprised of piezoelectric material.

In the configuration depicted in FIG. 2, touch that is received on the surface 220 of the computing device may cause a force to be transmitted through the cover 230 to the force sensing device 200. In some cases, the received force causes the compressible element 250 to compress, thereby bringing the first capacitive plate 240 and the second capacitive plate 260 closer together. The change in distance between the first capacitive plate 240 and the second capacitive plate 260 may result in a change of capacitance. The change in capacitance may then be detected and measured.

For example, in some cases, a force-sensing circuit may measure this change in capacitance and output a signal that corresponds to the measurement. A processing unit, integrated circuit or other electronic element may correlate the circuit output to an estimate of the force of the touch. However, as discussed above, depending on the elastic deformation characteristics of the compressible element 250, the output signal may not reflect an accurate amount of force being applied at a particular time. Additionally, the output signal may cause a delayed reaction from the computing device. For example, a user interface that is output on the display may not be updated in a timely manner or may commit to an action (e.g., launch an application, select an icon and so on) too soon. Accordingly, the methods described below may be used to account for the drift and/or delay that may be associated with the force sensing device 200.

Although the term "plate" may be used to describe certain elements, such as the capacitive plates or conductive electrodes, it should be appreciated that the elements need not be rigid but may instead be flexible (as in the case of a trace or flex).

Figure 3:
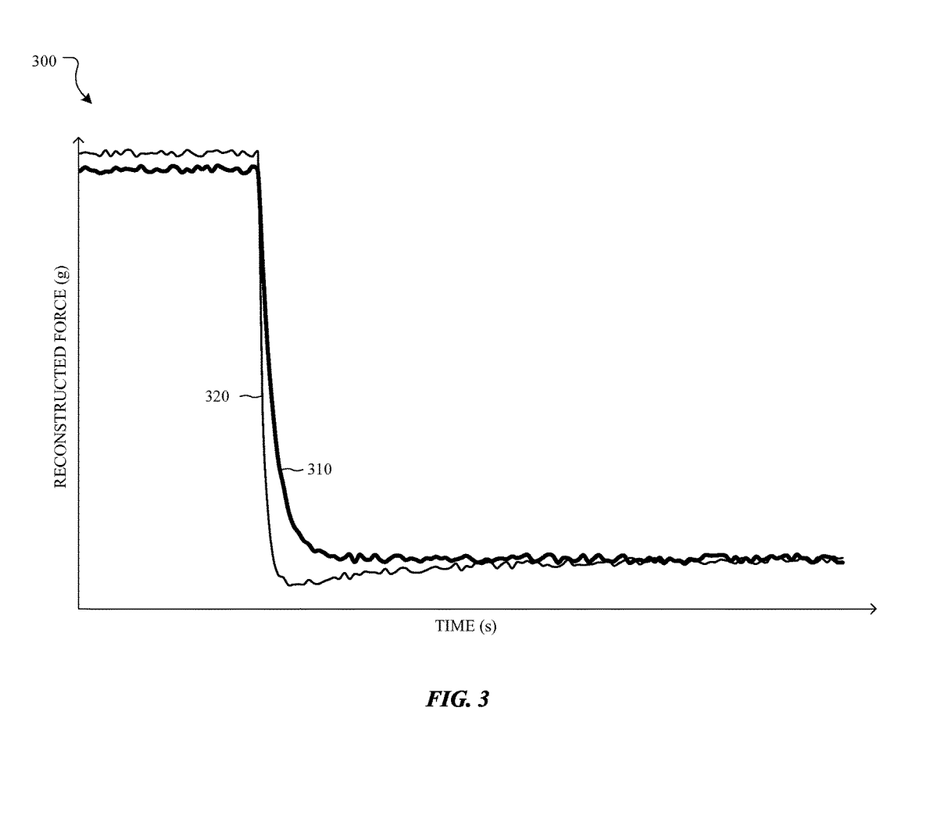
FIG. 3 is a graph that illustrates drift compensation according to one or more embodiments of the present disclosure.

FIG. 3 is a graph 300 that illustrates how drift in a force sensing device can be accounted for according to one or more embodiments of the present disclosure. More specifically, the graph 300 illustrates how an input force (e.g., a touch and release input force) received by a touch and/or force-sensing device may be reconstructed. For example, line 310 illustrates a reconstructed force that is sensed by the force sensing device prior to drift correction. Likewise, line 320 illustrates a drift-corrected reconstructed force of the same received force input. As shown in FIG. 3, the drift-corrected reconstructed force 320 may be flatter and/or have sharper edges when compared to the reconstructed force 310. The flatter and sharper edges may provide better feedback about the amount of force provided by the user when compared to the force that is not corrected.

As will be explained below, in order to generate or otherwise obtain the drift-corrected reconstructed force 320, a system model of the force sensing device is determined. More specifically, a system model of the force sensing device is used to approximate a transfer function that generates or otherwise provides the reconstructed force 310 output directly from the force sensing device in response to a force received from a user. In embodiments described herein, the reconstructed force 310 may be filtered with an inverse of the transfer function in order to generate (or otherwise determine) the drift-corrected reconstructed force 320.

As discussed above, the model may be a second-order system. For example, in some embodiments, the measurement of a force applied to a particular force sensitive device can be affected by the mass of the force sensitive device, the elastic deformation characteristics (e.g., stiffness, spring constant, damping coefficient, and so on) of the force sensitive device, the speed and/or acceleration with which the force sensitive device is displaced in response to the applied force, and so on. Further, in many embodiments, the force sensitive device may be implemented as a digital device. Accordingly, as a result of discrete sampling of the analog (e.g., continuous) output of one or more analog force sensors (e.g., capacitive, piezoelectric, and so on), the model of the force sensitive device may be a discrete time model. As such, the impulse response of the transfer function of a second-order discrete time model may be defined, in the frequency domain (e.g., Z-transform), by the following equation:

$$H(z) = \frac{a_0 + a_1 z^{-1}}{b_0 + b_1 z^{-1} + b_2 z^{-2}}$$

Although a second-order system is specifically mentioned, a higher or lower order system may be used. In some embodiments, the model of the force sensing device may be mathematically defined as a frequency domain convolution (e.g., multiplication) of a received amount of force with the impulse response of the force sensitive device yielding an output waveform (the reconstructed force 310) which can be represented as follows:

$$X(z) \cdot H(z) = Y(z)$$

In the above, X(z) may represent a Z-transform of a discrete time input that is associated with one or more discrete samples of a received amount of force, H(z) represents the impulse response of the system (e.g., the force sensing device) and Y(z) is a Z-transform of an output waveform that may be subject to drift (e.g., reconstructed force). In many cases, the system H(z) may be an unknown or unknowable system or may otherwise have an unknown effect on the input waveform X(z). For example, the waveform (continuous or discrete) output from a force sensitive device may not, in certain cases, accurately or precisely represent the force received at a particular time due to one or more elastic deformation characteristics of the materials in the force sensing device and/or the structure of the force sensing device.

Thus, as described herein, even though the system H(z) may be unknown or unknowable, the reconstructed force 310 can be used to calibrate the force sensitive device by assisting the approximation of a transfer function associated with the system, the inverse of which can, in turn, be used to improve the accuracy and/or precision of future reconstructed force measurements. That is, during a calibration operation, a specific input force having a Z-transform of X(z) can be applied to the force-sensitive device. As a result, because the input force X(z) is known, and the reconstructed force Y(z) is measureable, and the characteristics and properties of the materials and/or structure of the force sensing device are known or estimable, a model of the impulse response of the force sensing device may be determined. In one example, using the above second-order example impulse response equation and the reconstructed force 310, the coefficients (e.g. $a_0$, $a_1$, $b_0$, and so on) for the transfer function model may be determined or approximated. In some embodiments, the coefficients may be determined using a lookup table between the input waveform, the output waveform and the material (or the elastic deformation properties of the material and/or structure) used in the actual force sensing device. In another embodiment, the coefficients may be determined by using various fit techniques such as, for one example, a polynomial fit on the reconstructed force 310.

Once the coefficients for the transfer function are selected, an inverse of the transfer function may be determined. In some embodiments, the inverse transfer function may be represented by the equation:

$$\tilde{H}^{-1}(z) = \frac{b_0 + b_1 z^{-1} + b_2 z^{-2}}{a_0 + a_1 z^{-1}}$$

More specifically, once the inverse transfer function is determined, the inverse transfer function may be applied to the output waveform Y(z) to obtain the drift-corrected reconstructed force 320 that matches or substantially matches the provided input force. Because the inverse of the transfer function is used on the reconstructed force Y(z), the drift-corrected reconstructed force $\tilde{X}(z)$ does not exhibit the drift that may be present in or caused by the system.

In this manner, the entire system including the transfer function and its inverse described above, may be represented by:

$$X(z) \rightarrow H(z) \rightarrow Y(z) \rightarrow \tilde{H}^{-1}(z) \rightarrow \tilde{X}(z)$$

In certain embodiments, once the coefficients for the model H(z) are determined such as described above, the coefficients may be stored by the computing device. For example, in some implementations, algebraic manipulation of the discrete convolution of X(z) and H(z) can yield coefficients for H(z). The coefficients for the model can be stored in firmware of the computing device. Accordingly, as force input is received, the model, and its associated coefficients, may correct or otherwise account for the drift.

In some embodiments, it may be desirable to know or otherwise determine whether the transfer function and the inverse transfer function described above are stable. For example, because the coefficients of the system may be determined experimentally, the coefficients of the transfer function, and more specifically the coefficients of the inverse transfer function, may be unstable and provide undesired results for particular force inputs.

Figure 4:
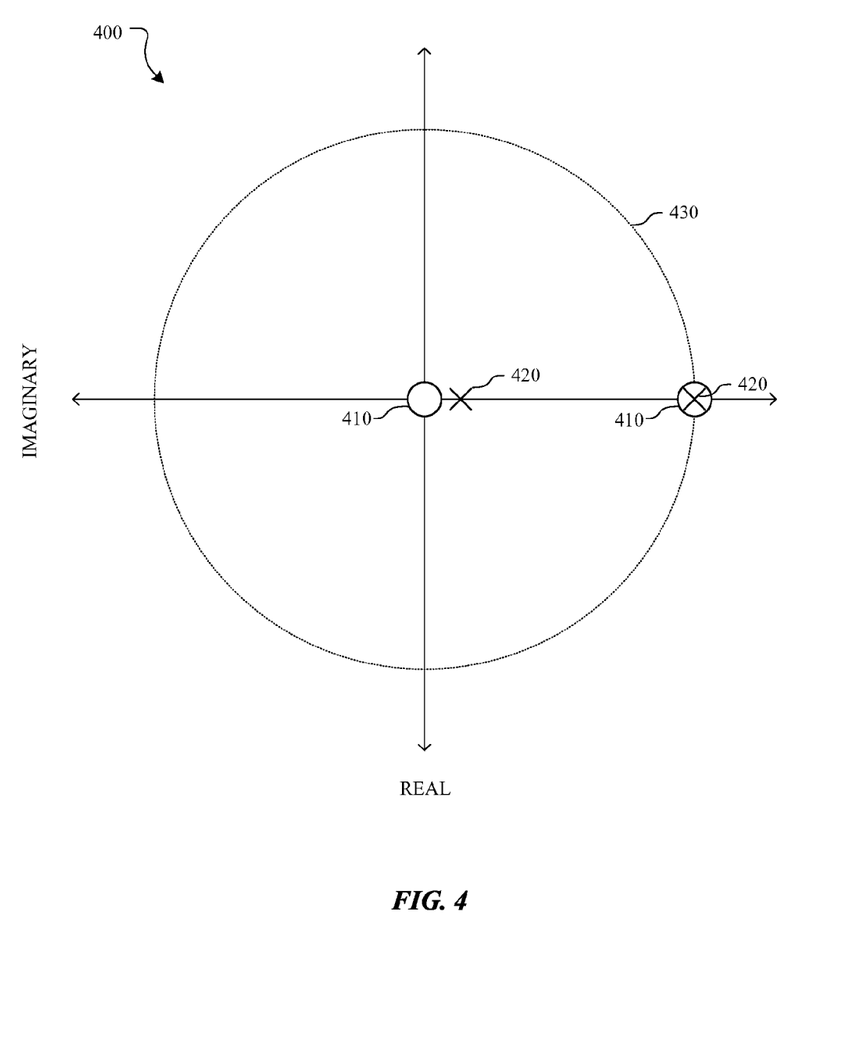
FIG. 4 illustrates an exemplary zero-pole plot graph that may be used when compensating for drift according to one or more embodiments of the present disclosure.

As shown in FIG. 4, a zero-pole plot graph 400 may be used to plot the poles 420 and zeros 410 of the transfer function and/or the inverse transfer function described above. In some cases, the poles and zeros of the transfer function are inverse from the poles and zeros of the inverse transfer function. In some embodiments, the stability of the system corresponds to the position of the poles 420 and zeros 410 with respect to the unit circle 430.

For example, in some implementations, when the inverse transfer function is stable, the poles of the inverse transfer function should lie inside the unit circle 430. However, the farther the poles 420 and zeros 410 are from the unit circle 430, the less drift compensation may be present despite that the system is more stable. Likewise, the closer the poles 420 and zeros 410 are to the unit circle 430, more of the drift may be corrected but the system may be less stable.

In some implementations, the inverse transfer function can act as a high pass filter which can have the effect of amplifying or preserving high frequency noise within the system. As such, a high frequency noise filter may be applied to the output signal or waveform associated with the drift-corrected reconstructed force 320.

Figure 5:
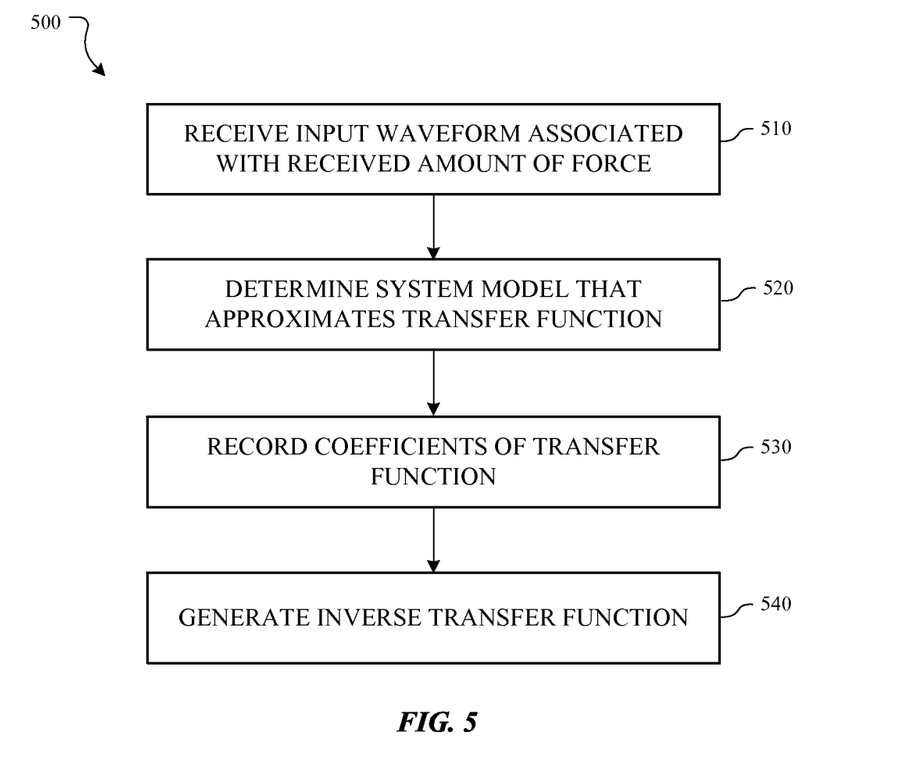
FIG. 5 illustrates a method for calibrating a force sensor according to one or more embodiments of the present disclosure.

FIG. 5 illustrates a method 500 for calibrating a force sensing device according to one or more embodiments of the present disclosure. In some embodiments the method 500 may be used to calibrate the force sensing device 200 shown and described above with respect to FIG. 2. In some embodiments, the method 500 may be performed at a factory in which the computing device and/or the force sensing device is manufactured, assembled and/or packaged. Accordingly, the method 500 may be used at the factory to calibrate the force sensing device. In some embodiments, the calibration that is performed is device specific. That is, each device may be calibrated using the method although different coefficients for the transfer function and its inverse may be determined. However, it is also contemplated that the method 500 may be used at other times so long as a reference model may be determined for calibration purposes.

Method 500 begins at operation 510 when an input force is received (e.g., input waveform). In some embodiments, the input force may take the form of a square waveform that represents an amount of force received by the force sensing device during a press and release event on the computing device or other such input device.

As the input waveform is received, the input waveform may be modified or otherwise changed by the force sensing device. That is, due to the structure of the force sensing device and/or the elastic deformation properties of the materials within the force sensing device, the input waveform may become distorted or delayed. More simply, drift in magnitude and/or time of the input waveform may be introduced by the system. Accordingly, in operation 520 a system model is determined that approximates a transfer function associated with the force sensing device.

More specifically, in response to the input waveform that was received, an output waveform is generated by the system. The output waveform, and more specifically reconstructed force represented by the output waveform may include drift. The reconstructed force is then used to approximate a transfer function associated with the force sensing device. For example, because the input force is known, the reconstructed force is known, and the materials in the force sensing device are known, a transfer function of the system may be approximated.

Once the transfer function is approximated (and coefficients of the transfer function are determined), a model of the transfer function may be determined. In some implementations and as discussed above, the model may be a second-order system model of the force sensing device.

In operation 530 the coefficients of the model are stored or otherwise recorded. For example, in some cases, the coefficients of the model may be stored by the computing device in which the force sensing device is placed.

Flow then proceeds to operation 540 and the inverse of the transfer function is determined. The inverse transfer function is then applied to the output waveform. In some implementations, applying the inverse transfer function to the output waveform generates a drift corrected output waveform that accounts for drift in the system.

In some embodiments, the stability of the transfer function, and more specifically the inverse transfer function is determined. The stability of the transfer function may be determined by plotting the coefficients of the transfer function on a zero-pole plot graph such as described above. For example, if the poles of the coefficients are within the unit circle of the zero-pole plot graph, the system may be stable. In some cases, the coefficients may be changed and/or re-plotted to obtain values for coefficients that obtain a desired amount of drift correction, noise and/or stability.

Figure 6:
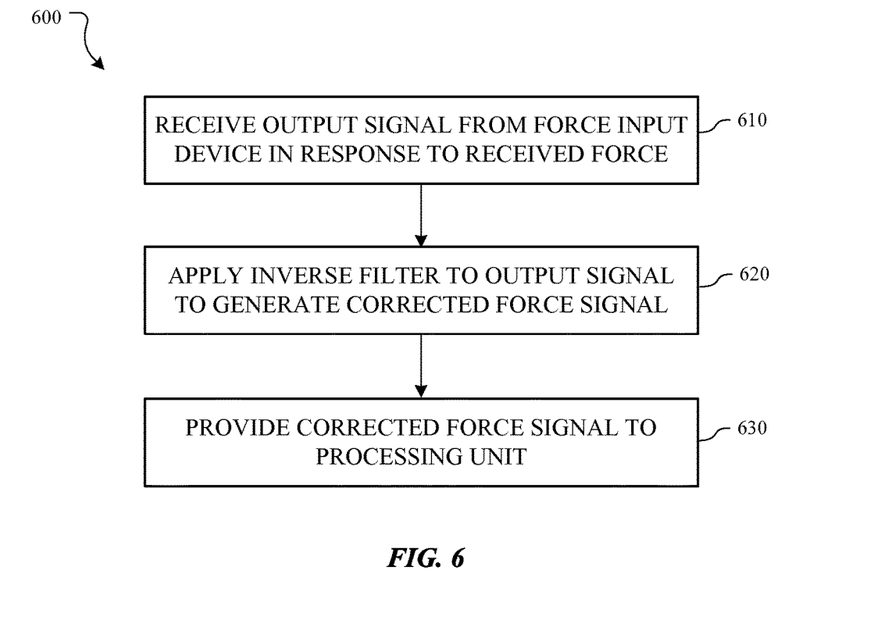
FIG. 6 illustrates a method for compensating for drift according to one or more embodiments of the present disclosure.

FIG. 6 illustrates a method 600 for compensating for drift according to one or more embodiments of the present disclosure. In some embodiments, the method 600 may be used in conjunction with the method 500 described above. In other embodiments, the method 600 may be used as force input is being provided on a computing device having a force sensing device. Thus, the method 600 may be correct for drift in real time or substantially real time. For example and as described above, if the magnitude and/or time of an input waveform is affected by drift, the user experience with the force sensing device, and ultimately the computing device or other such input device may be negatively impacted.

However, in cases where drift is compensated for, a more accurate representation of force input may be determined. As a result, received commands, in the form of force input, may be more readily recognized and processed. In addition, different types of force input may be more readily distinguishable from one another. That is, the force sensing device may be better able to distinguish between a first amount of force associated with a first command and a second amount of force that is associated with a second, different command.

Method 600 begins at operation 610 in which an output signal is received from a force sensing device. The output signal may be associated with a received amount of force sensed by the force sensing device. For example, the output signal may represent an amount of force provided by a user on a display or other surface of a computing device. As discussed above, the received amount of force may be associated with a particular command or type of command.

Once the output signal is received, flow proceeds to operation 620 and an inverse filter is applied to the output signal to generate a corrected force signal. More specifically, drift may have been introduced to the output signal as a result of various materials in and/or structure of the force sensing device. Accordingly, a transfer function associated with the model is approximated and a model of the force sensing device is determined. That is, the transfer function that represents the change from an input signal (that represents a received amount of force) to the output signal is approximated. The inverse of the transfer function is then applied to the output signal to correct or otherwise compensate for the drift.

Once the drift is accounted for, flow proceeds to operation 630 and the corrected force signal may be provided to a processing unit of the computing device. Once the corrected force signal is received, the processing unit may instruct the computing device, and more specifically various components, modules or programs of the computing device, to function or provide functionality based on the received amount of force. For example, the processing unit may be able to more readily determine the difference in the received force input which may allow the computing device to utilize a wide range of commands having different force input values than was previously available.

In some embodiments, drift in the system may also be compensated using a drift threshold. For example, at calibration, an amount of drift in the system may be determined. Once the amount of drift is determined, a drift threshold may be used to negate, substantially negate or otherwise account for the detected drift.

In another embodiment, a time limit for a detected amount of force may be implemented by the computing device. That is, if received force exceeds a predetermined time limit (e.g., 2 seconds) the force sensing device will not continue detecting or otherwise processing a received force input.

Figure 7:
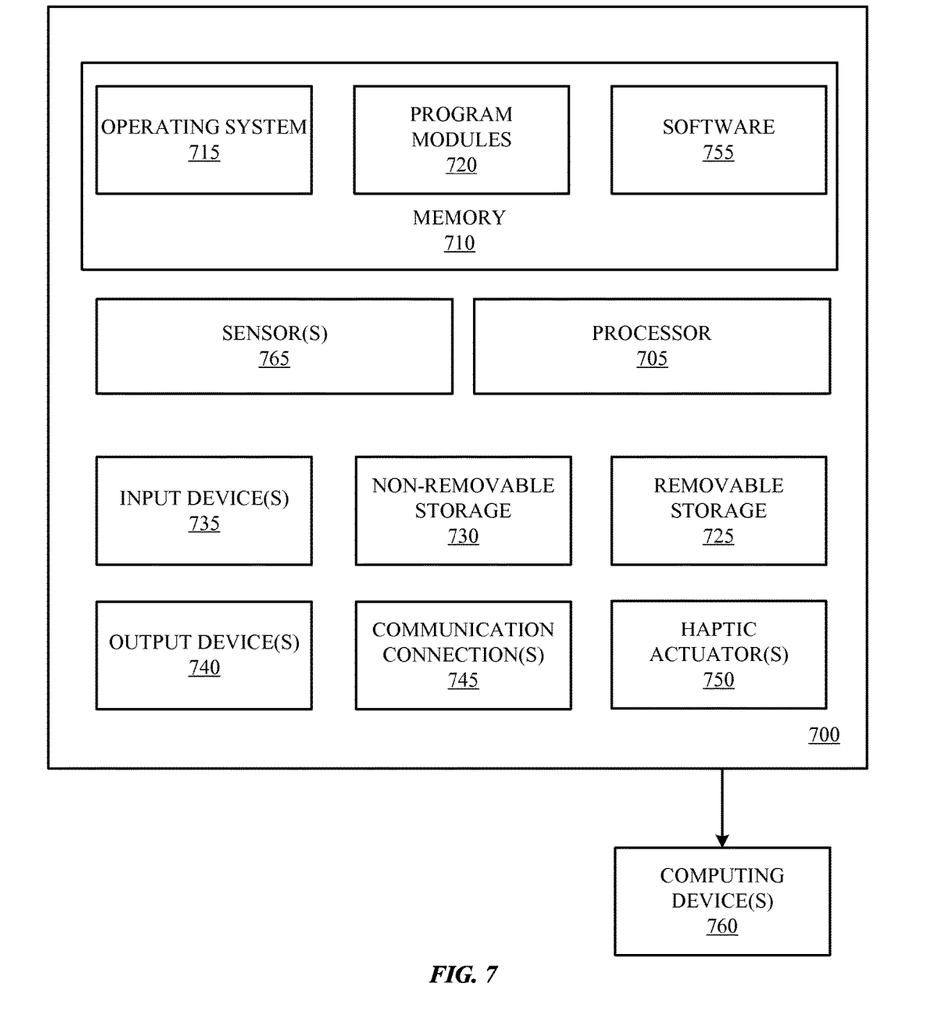
FIG. 7 is a block diagram illustrating exemplary components of a computing device according to one or more embodiments of the present disclosure.

FIG. 7 is a block diagram illustrating exemplary components, such as, for example, hardware components, of a computing device 700 according to one or more embodiments of the present disclosure. In certain embodiments, the computing device 700 may be similar to the various computing devices 100 described above. Although various components of the computing device 700 are shown, connections and communication channels between each of the components are omitted for simplicity.

In a basic configuration, the computing device 700 may include at least one processor 705 or processing unit and a memory 710. The processor 705 may be used to determine the various calibration parameters or coefficients described above and/or may be used to apply the inverse transfer function to a waveform in real time or substantially real time or as needed. The memory 710 may comprise, but is not limited to, volatile storage such as random access memory, non-volatile storage such as read-only memory, flash memory, or any combination thereof. The memory 710 may store an operating system 715 and one or more program modules 720 suitable for running software applications 755. The operating system 715 may be configured to control the computing device 700 and/or one or more software applications 755 being executed by the operating system 715. The software applications 755 may include browser applications, e-mail applications, calendaring applications, contact manager applications, messaging applications, games, media player applications, time keeping applications and the like some or all of which may receive or be controlled or altered using a received force input.

The computing device 700 may have additional features or functionality than those expressly described herein. For example, the computing device 700 may also include additional data storage devices, removable and non-removable, such as, for example, magnetic disks, optical disks, or tape. Exemplary storage devices are illustrated in FIG. 7 by removable storage device 725 and a non-removable storage device 730. In certain embodiments, various program modules and data files may be stored in the memory 710.

As also shown in FIG. 7, the computing device 700 may include one or more input devices 735. The input devices 735 may include a trackpad, a keyboard, a mouse, a pen or stylus, a sound input device, a touch input device, a force sensing device and the like. The computing device 700 may also include one or more output devices 740. The output devices 740 may include a display, one or more speakers, a printer, and the like. The computing device 700 may also include one or more haptic actuators 750 that are configured to provide both tactile and audio output.

The computing device 700 may also include one or more sensors 765. The sensors may include, but are not limited to, accelerometers, ambient light sensors, photodiodes, gyroscopes, magnetometers and so on.

The computing device 700 also includes communication connections 745 that facilitate communications with additional computing devices 760. Such communication connections 745 may include a RF transmitter, a receiver, and/or transceiver circuitry, universal serial bus (USB) communications, parallel ports and/or serial ports.

As used herein, the term computer-readable media may include computer storage media. Computer storage media may include volatile and nonvolatile media and/or removable and non-removable media implemented in any method or technology for the storage of information. Examples include computer-readable instructions, data structures, or program modules. The memory 710, the removable storage device 725, and the non-removable storage device 730 are all examples of computer storage media. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media may store instructions which, when executed by the processor 705, dynamically adjust a current applied to a light source.

In certain embodiments, the computing device 700 includes a power supply such as a battery, a solar cell, and the like that provides power to each of the components shown. The power supply may also include an external power source, such as an AC adapter or other such connector that supplements or recharges the batteries. The computing device 700 may also include a radio that performs the function of transmitting and receiving radio frequency communications. Additionally, communications received by the radio may be disseminated to the application programs. Likewise, communications from the application programs may be disseminated to the radio as needed.

Embodiments of the present disclosure are described above with reference to block diagrams and operational illustrations of methods and the like. The operations described may occur out of the order as shown in any of the figures. Additionally, one or more operations may be removed or executed substantially concurrently. For example, two blocks shown in succession may be executed substantially concurrently. Additionally, the blocks may be executed in the reverse order.

In addition, it will be understood that variations and modifications can be effected within the spirit and scope of the disclosure. And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

We claim:

1. A computing device comprising:
   a force sensing device; and
   a processing unit operatively coupled to the force sensing device, the processing unit configured to:
   receive an output signal from the force sensing device; and
   apply an inverse filter to the output signal to generate a reconstructed output signal that compensates for drift, wherein the inverse filter is based, at least in part, on a model of the force sensing device derived at a time the computing device is calibrated.

2. The computing device of claim 1, further comprising a display having a user interface, wherein the processing unit causes the user interface to change state based, at least in part, on the reconstructed output signal.

3. The computing device of claim 1, wherein the output signal is associated with an amount of force applied to the force sensing device.

4. The computing device of claim 1, wherein the model of the force sensing device is a second-order system model.

5. The computing device of claim 1, wherein coefficients of the model are determined using a polynomial fit on the output signal.

6. The computing device of claim 5, wherein the coefficients of the model are stored by firmware of the computing device.

7. The computing device of claim 1, wherein the processing unit is further configured to apply a noise filter to the reconstructed output signal.

8. A method for correcting drift associated with a force sensing device associated with a computing device, the method comprising:
   receiving an output signal from the force sensing device; and
   applying an inverse filter to the output signal to generate a reconstructed output signal that compensates for drift, wherein the inverse filter is based, at least in part, on a model of the force sensing device derived at a time the computing device is calibrated.

9. The method of claim 8, further comprising causing a user interface associated with the computing device to change state based, at least in part, on the reconstructed output signal.

10. The method of claim 8, wherein the output signal is associated with an amount of force applied to the force sensing device.

11. The method of claim 8, wherein the model of the force sensing device is a second-order system model.

12. The method of claim 8, wherein coefficients of the model are determined using a polynomial fit on the output signal.

13. The method of claim 8, further comprising applying a noise filter to the reconstructed output signal.

* * * * *